(12) United States Patent
Mintz

(10) Patent No.: US 7,933,825 B2
(45) Date of Patent: *Apr. 26, 2011

(54) METHOD OF OPERATING A VENTURE BUSINESS

(76) Inventor: Harold P. Mintz, Fort Lee, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/482,153

(22) Filed: Jun. 10, 2009

(65) Prior Publication Data

US 2010/0153253 A1    Jun. 17, 2010

Related U.S. Application Data

(63) Continuation of application No. 09/714,619, filed on Nov. 17, 2000, now Pat. No. 7,548,880.

(51) Int. Cl.
*G06Q 40/00* (2006.01)
(52) U.S. Cl. .......................... 705/36 R; 705/35; 705/37
(58) Field of Classification Search .................... 705/35, 705/36 R, 37
See application file for complete search history.

(56) References Cited

U.S. PATENT DOCUMENTS

| | | | |
|---|---|---|---|
| 4,885,685 | A | 12/1989 | Wolfberg et al. |
| 6,076,072 | A | 6/2000 | Libman |
| 6,571,219 | B1 | 5/2003 | Spivey |
| 2001/0029476 | A1 | 10/2001 | Mallenbaum |
| 2001/0032157 | A1 | 10/2001 | Dannenberg et al. |
| 2001/0034692 | A1 | 10/2001 | McRedmond |
| 2002/0010669 | A1 | 1/2002 | Street |
| 2002/0046038 | A1 | 4/2002 | Prokoski |
| 2002/0095305 | A1 | 7/2002 | Gakidis et al. |
| 2002/0156709 | A1 | 10/2002 | Andrus et al. |
| 2003/0028467 | A1 | 2/2003 | Sanborn |
| 2003/0208397 | A1 | 11/2003 | VanDusen |

OTHER PUBLICATIONS

McGee, Suzanne. "Small Investors Can Dabble in the Venture-Capital GAme—Fund Seeks Returns in Silicon Valley Start-Ups". Wall Street Journal. (Europe). Brussels: Aug. 9, 2000. p. 8.*
Associated Press. "Firms Issued Record Amount in Stocks, Bonds". St. Louis Post—Dispatch (pre-1997 Fulltext). St. Louis, MO.: Jan. 5, 1992, p. 3F.*
Taylor, Dennis. "Draper to Launch Venture IPO". The Business Journal. San Jose: Dec. 17, 1999. vol.17, Iss.35. p. 1.*

(Continued)

*Primary Examiner* — Lalita M Hamilton
(74) *Attorney, Agent, or Firm* — Carlos R. Villamar; The Villamar Firm PLLC

(57) ABSTRACT

A method of operating a venture capital investment business, comprising establishing a business entity; the business entity establishing an investment fund; establishing a fund managing entity of the investment fund, the fund managing entity attending to administrative matters relating to the investment fund and making investment decisions for the fund; the investment fund having investors that provide capital contributions to the fund, the fund managing entity also providing capital contributions to the fund, the fund utilizing the contributions to invest in portfolio entities; the investors receiving a general participation interest in the fund, and the fund managing entity receiving a carried interest in the fund; providing the investors that have provided at least a threshold capital contribution to the fund with stock rights in the business entity to enable such investors to become shareholders in the business entity; the business entity securing a portion of IPO shares that become available in the portfolio entities; and the business entity enabling shareholders thereof to purchase IPO shares that become available in the portfolio entities.

20 Claims, 5 Drawing Sheets

OTHER PUBLICATIONS

Equity Capital for Nonmetropolitan Businesses: An Introduction to Alternative Sources and Directory to Related Websites:, Barkley et al, Nov. 1999.

"Risk Financing and Venture Capital Market in Finland", Virtanen, Markku, Feb. 14, 1997.

"Survival Tips for Budding Internet Entrepreneurs", Regional Business News, Kaufman, Sep. 10, 1999.

Taylor, Dennis. "Draper to Launch Venture IPO". The Business Journal. San Jose: Dec. 17, 1999. vol. 17, Issue 35, p. 1.

Associated Press. "Firms Issued Record Amount in Stocks, Bonds". St. Louis Post—Dispatch (pre-1997 Fulltext). St. Louis.

McGee, Suzanne. "Small Investors Can Dabble in the Venture-Capital GAme—Fund Seeks Returns in Silicon Valley Start-ups". Wall Street Journal. (Europe). Brussels: Aug. 9, 2000. p. 8.

Raymond James & Associates, Inc., meVc Draper Fisher Jurvetson Fund 1, "An Information Technology Venture Capital Fund", Mar. 2, 2000.

U.S. Appl. No. 60/173,490, filed Dec. 29, 1999.
U.S. Appl. No. 60/193,364, filed Mar. 31, 2000.
U.S. Appl. No. 60/205,108, filed May 18, 2000.
U.S. Appl. No. 60/243,981, filed Oct. 27, 2000.

* cited by examiner

METHOD OF OPERATING A VENTURE BUSINESS

CROSS-REFERENCE TO RELATED APPLICATIONS

This application is a continuation of U.S. Ser. No. 09/714,619, filed on Nov. 20, 2000.

BACKGROUND OF THE INVENTION

The present invention relates generally to the structuring of a venture capital business, and more particularly, to one which provides unique participation opportunities for investors.

Conventional venture capital is typically conducted by establishing a venture capital or buyout fund in the form of a partnership or limited liability company. Where the fund is set up in the form of a partnership, it includes a general partner and limited partner investors. Where the fund is set up in the form of a limited liability company, or other business entity other than a partnership, it typically includes a managing member and member investors.

The general partner or managing member of the typical venture capital fund is usually responsible for attending to the day-to-day administrative functions associated with running the fund. The investors provide the great majority (e.g., typically about 95%-99%) of the capital that goes into the fund for the fund to invest in various portfolio companies. The general partner or managing member typically contributes a smaller amount (e.g., approximately 1%-5%). The general partner/managing member may earn a carried interest (a percentage of the fund's profits from successful investing) of typically about 20%. In addition, the general partner, or a separate management entity, will be paid an annual management fee (e.g., about 2% of the total capital committed to the fund).

Although venture capital funds can potentially provide significant returns to the fund investors, such returns are limited to the performance/profits of the fund alone.

Venture capital may also be conducted in the form of a corporation ("venture corporation") that makes direct investments in companies. It has also been known for venture corporations to establish and run a venture capital fund. These models are less prevalent than the traditional fund approach.

From time to time, portfolio companies in which the fund or venture corporation invests may become sufficiently successful to have an opportunity to raise significant capital through an initial public offering (IPO). Venture capital funds or venture business entities that have invested in a company that is having an IPO may have an opportunity to participate in the IPO via a Directed Share Subscription Program (DSSP) or rights offering. Occasionally, when a venture capital fund or venture corporation agrees to invest in a portfolio company, the portfolio company may agree to lock up a predetermined, disproportionate number of IPO shares in favor of the venture capital company in the event that the portfolio company is subject to an IPO.

From an investor's perspective, while many are interested in participating in IPOs, access to the same has been primarily limited to institutions and high net worth investors directly invested in venture capital funds or having ties to large underwriting institutions. While recently an assortment of venture capital groups have gone public, the vast majority are still traditional private funds inaccessible to the general public. The typical private fund model requires a large initial investment with a long lock up period (the period for which the investors are prohibited from transferring or selling their interests). The lock up period is typically for the life of the fund (usually a seven year commitment), and there are substantial restrictions imposed with respect to salability and transferability.

It is an object of the present invention to provide a method of operating a venture capital investment business that provides a unique opportunity for investors to participate in IPOs. In accordance with this object, the present invention provides a method of operating a venture capital investment business, comprising establishing a business entity; the business entity establishing an investment fund; establishing a fund managing entity of the investment fund, the fund managing entity attending to administrative matters relating to the investment fund and making investment decisions for the fund; the investment fund having investors that provide capital contributions to the fund, the fund managing entity also providing capital contributions to the fund, the fund utilizing the contributions to invest in portfolio entities; the investors receiving a general participation interest in the fund, and the fund managing entity receiving a carried interest in the fund; providing the investors that have provided at least a threshold capital contribution to the fund with stock rights in the business entity to enable such investors to become shareholders in the business entity; the business entity securing a portion of IPO shares that become available in the portfolio entities; and the business entity enabling shareholders thereof to purchase IPO shares that become available in the portfolio entities.

It is a further aspect of the invention for the fund managing entity to have at least one other fund managing entity to direct investment decisions for the fund, and to provide said at least one other fund managing entity with stock rights in the business entity to enable said at least one other fund managing entity to become a shareholder in said business entity. Through this vehicle, the at least one other fund managing entity can purchase IPO shares that become available in the portfolio entities.

It is a further aspect of the invention to provide such a venture capital investment business wherein portfolio entities are provided with stock rights in the business entity.

It is a further aspect of the invention to provide a method of distributing stock rights, wherein capital contribution information is received relating to an amount of capital contributed by an investor to a fund, the fund having investments in a portfolio entity; the capital contribution information is compared to a threshold value; and consequent to said comparing, stock rights in a business entity having stock rights in the portfolio entity are assigned to the investor.

It is a further aspect of the invention to provide a data storage medium having machine-readable code stored thereon, the machine-readable code including instructions executable by an array of logic elements, the instructions defining a method wherein capital contribution information is received relating to an amount of capital contributed by an investor to a fund, the fund having investments in a portfolio entity; the capital contribution information is compared to a threshold value; and consequent to said comparing, stock rights in a business entity having stock rights are assigned to the investor in the portfolio entity.

Other objects and aspects of the invention will become apparent from the following description, drawings and claims.

DETAILED DESCRIPTION OF THE DRAWINGS

Figure 1:
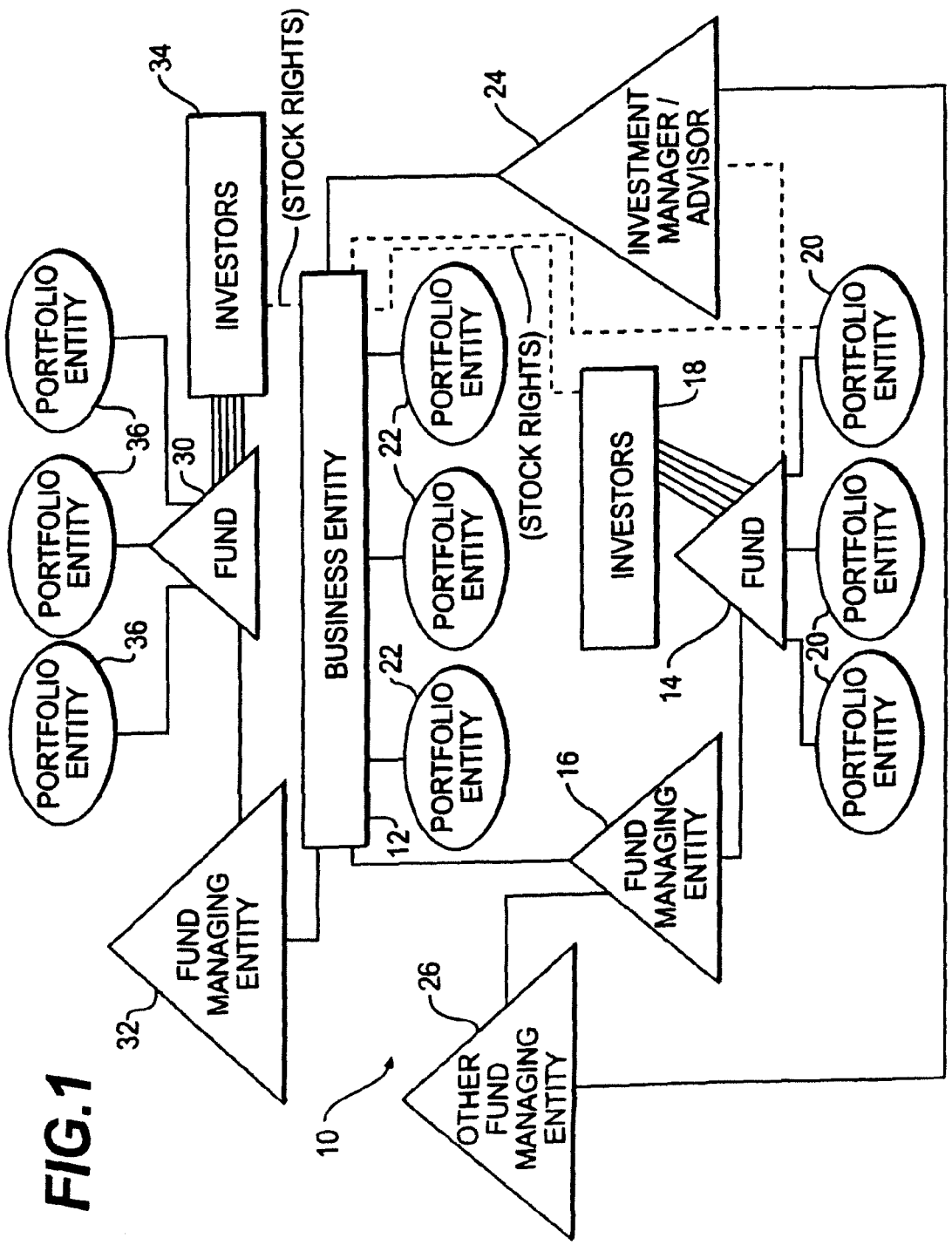
FIG. 1 is a diagrammatic representation of a venture capital business in accordance with the principles of the present invention.

Illustrated in FIG. 1 is a diagrammatic representation of a venture capital investment business, as generally indicated at 10, in accordance with the principles of the present invention.

As illustrated in FIG. 1, a business entity 12 is established. The business entity 12 makes stock and certain stock rights available therein. In a preferred embodiment, the business entity 12 is incorporated and is a public company. The business can also be a limited liability corporation (L.L.C.), partnership, trust, or other unincorporated organization. The stock rights available in the business entity 12 are preferably stock options, but may also be warrants, restricted stock grants, phantom stock rights, stock appreciation rights, or other commonly accepted rights to acquire shares or equity in the business entity 12.

As also shown in FIG. 1, an investment fund 14 is established. A fund managing entity 16 of the investment fund 14 is also established. The fund managing entity 16 attends to the day-to-day administration and operations of the fund 14. In the event that the fund 14 is established in the form of a limited partnership (L.P.), then the fund managing entity 16 is a general partner of the fund. In the event that the fund 14 is established in the form of a limited liability corporation (L.L.C.) or other type of business entity other than a partnership, then the fund managing entity 16 is a managing member of the fund 14.

The fund 14 has investors 18 that provide capital contributions to the fund 14. The investors 18 will be members of the fund in the event that the fund 14 is established as a limited liability corporation or other type of business entity other than a partnership. The investors 18 will be limited partners of the fund 14 in the event that the fund 14 is established as a limited partnership.

The fund managing entity 16 also provides capital contributions to the fund 14. Approximately 95%-99% of the capital contributions is received from the investors 18 and approximately 1%-5% is received from the fund managing entity 16, but these percentages are preferred examples only. In a preferred embodiment, the fund managing entity 16 receives the money to make its 1%-5% contribution from the business entity 12.

Preferably, the fund 14 is set up as a partnership, with the fund managing entity 16 being a general partner of the fund 14, and the fund investors 18 being limited partners in a limited partnership (L.P.) fund 14. Preferably, the general partner, fund managing entity 16, is established in the form of a limited liability corporation (L.L.C.), but can be any other organization suitable to operate as the fund managing entity 16.

The fund 14 utilizes the capital contributions from the investors 18 and the fund managing entity 16 to invest in portfolio entities 20. The portfolio entities 20 are, for example, companies or other business organizations that the fund 14 has determined to be good investments. The fund managing entity 16 may employ at least one other fund managing entity 26 to direct investment decisions and manage the fund. This other fund managing entity 26 may be a person or business.

The investors 18 and fund managing entity 16 both receive an earned percentage interest in the fund's profits from successful investing. Specifically, the investors receive what is termed a general participation interest in the fund. It is contemplated that the general participation interest will preferably be a return of capital, plus a preferred rate of return (e.g., between 7-9%, and most preferably 8%), plus a pro-rata share (based on the relative capital contributed) of about 80% of the fund's profits. The fund managing entity receives a return of capital, plus what is termed a carried interest or "carry" in the fund, which is typically about 20% of the fund's profits.

In accordance with the principles of the present invention, the investors 18 that provide at least a threshold capital contribution amount into the fund 14 will be entitled to receive a portion of the stock rights in the business entity 12. For example, in a preferred embodiment, limited partner investors 18 that invest $1,000,000 or more in the fund 14 will be entitled to receive stock options or warrants in the business entity 12. It is contemplated that the threshold capital contribution will be based on a requirement that the investor invest a predetermined amount of money into the fund. While the threshold contribution of $1,000,000 noted above is preferred, this is exemplary only. Also, it is contemplated that an investor 18 that invests as little as $100,000 may be entitled to stock rights.

It can be considered that the investors 18 that are entitled to stock rights in business entity 12 are receiving said stock rights as a quid pro quo in partial consideration for allowing the business entity 12 to secure the stock rights (e.g., DSSP rights) in the portfolio entities 12.

Typically, investors will commit or promise to invest a certain amount of capital into the fund 14 in advance of the actual payment. Preferably, the business entity 12 will commit to transfer options to investors 18 to purchase a certain number of shares in the business entity 12 at the same time that the investors 18 commit to making capital contributions. However, it is also preferable that the options not be exercisable immediately and that they be forfeited if the investor 18 does not fulfill its contractual commitments. It is preferred that the options in the business entity 12 vest only as the investors 18 make their capital call contributions when called to do so by the fund managing entity 16. It is also preferred that the options vest on a pro-rata basis. That is, the options will vest on a percentage basis in accordance with the capital contributions actually made as a percentage of the total commitment. It is also contemplated that the number of options made available to individual investors 18 are commensurate with the amount of capital committed into the fund 14.

Preferably, the options will have a predetermined duration. That is, the investors 18 will be given a certain period of time to exercise the options to purchase shares in business entity 12, after which time the options will expire. The options will be exercisable at a predetermined price. Preferably the option price is established on the date that escrow is broken on the fund 14 and will preferably be based on the fair market value of the business entity 12 at that time.

In accordance with another aspect of the invention, shareholders in the business entity 12, including those investors 18 that have become shareholders by virtue of exercising options for which they have become eligible through meeting the threshold investment amount in fund 14, will benefit from directed share subscription programs (DSSPs) and/or rights offerings offered by the business entity 12. Particularly, in accordance with one aspect of the invention, in consideration of the fund 14 investing in portfolio entities 20, the portfolio entities 20 will execute an agreement committing that, in the event the portfolio entity 20 is subject to an initial public offering (IPO), a certain portion of the IPO shares will be made available (locked-up) in favor of the business entity 12.

As a result, during a rights offering or DSSP, shareholders in the business entity 12, including those investors 18 that have become shareholders by exercising their options in the business entity 12 through the fund 14, will become eligible to purchase stock in a portfolio entity 20 subject to its IPO and at the IPO price. Of course, other shareholders in the business entity 12 who are direct shareholders (not through the fund 14) will also be entitled to purchase IPO stock in a portfolio entity subject to an IPO. Preferably, the shareholders in business entity 12 will be permitted to purchase a certain percentage of the IPO shares made available to the business entity 12 based upon a pro-rata percentage ownership in the shares of business entity 12. It is contemplated, however, that only shareholders that have at least a threshold number or percentage of shares in the business entity 12 be eligible to purchase IPO shares in the portfolio entities 20. In the event that certain shareholders are not eligible to participate in an IPO or choose not to participate, it is contemplated that those IPO shares will be offered on a pro-rata basis to the remaining shareholders in the business entity 12, or may be given to the underwriter of the IPO for it to offer.

Preferably, shareholders of record (e.g., direct shareholders and option holders that have exercised their options in business entity 12) at the time of the Securities and Exchange Commission's initial IPO filing on behalf of a portfolio entity 20 will be entitled to participate in a given IPO.

As noted above, it is contemplated that the fund managing entity 16 will employ at least one other fund managing entity 26 to direct investment decisions for the fund 14. It is further contemplated, in accordance with another aspect of the invention, for such at least one other fund managing entity 26 to receive some of the stock rights (e.g., options) in the business entity 12 at a level to be negotiated. In one embodiment, the amount of stock rights to which said at least one other fund managing entity 26 is entitled to be granted is based upon the performance of the fund 14 and/or the tenure of the said at least one other fund managing entity 26. The granted stock rights provide a vehicle through which the investment decision maker can participate in the success of the business entity 12 and also participate in any IPO that one of the portfolio entities 20 is subject to. This is beneficial in that it will help enable the business entity 12 to attract exceptional personnel to manage the investment decisions for the fund 14.

In accordance with another aspect of the invention, the portfolio entities 20 are also provided with stock rights in the business entity 12 at a level to be negotiated. This will enable the business entity to attract the most promising portfolio entities 20, and enable portfolio entities 20 to participate in IPOs of other portfolio entities that are within the fund 14 or a family of funds controlled by the business entity 12.

It can be appreciated that, in accordance with one aspect of the invention, the interests of a wide variety of stakeholders in a distributed and integrated venture capital enterprise are aligned.

It is further contemplated that the business entity 12 may invest directly in additional portfolio entities 22, other than those invested in through a fund.

It is further contemplated that an investment manager/advisor 24 may provide investment advice to the fund 14, and receive an annual management fee, preferably 2% of the committed capital to the fund 14. This investment manager/advisor 24 is optional, as it is relevant in only certain jurisdictions such as New York City to address certain issues, such as organizational tax issues such as the unincorporated business tax. Otherwise, the function of the investment manager/advisor 24 can be performed by the fund managing entity 16. For the purpose of this disclosure, the term "fund managing entity" includes the investment manager/advisor 24 in the instance in which it is a separate entity. In other words, the investment/advisor 24 can be considered as being subsumed or part of the fund managing entity 16.

As also illustrated in FIG. 1, a second fund 30 (or several funds) may also be established by the business entity 12. The fund 30 is run in the same manner as fund 14. Specifically, fund 30 is managed by a fund managing entity 32 and has limited partner investors 34. The fund 30 invests in portfolio business entities 36.

Business entity 12 controls what may be considered a family of funds, including, but not limited to, funds 14 and 30.

In accordance with an aspect of the invention, investors 18 and 34 who have obtained stock rights in business entity 12 through making a threshold minimum investment in the associated funds 14 or 30, and have thereby subsequently become shareholders in business entity 12, are able to participate in an IPO in any one of the portfolio entities 20, 22 or 36, whether or not those entities 20, 22 or 36 have been invested in by the fund in which the investors have invested. For example, investors 18 in fund 14 that have met the minimum investment threshold will be entitled to participate in the IPOs of portfolio entities 22 and 36, so long as they have become shareholders in business entity 12 by exercising their stock rights.

The principles set forth herein apply to both rights offerings and DSSPs. During a rights offering, business entity 12 shareholders will receive rights (similar to call options) that allow them to purchase stock in a portfolio entity 20 at the IPO price. The DSSP program is a "partial" rights offering, wherein a portfolio entity 20 is taken public to a combination of business entity 12 shareholders and outside underwriters' books of business. In the DSSP instance, it is contemplated that the business entity 12 shareholders will participate in the IPO according to their ownership interests in the business entity 12 subject to the percentage of the offering that is being distributed by the underwriters. The DSSP has an advantage over rights offerings in that it shares the wealth with underwriters and increases distribution and post-IPO analyst coverage. Nevertheless, the principles and advantages set forth herein apply to rights offerings as well as DSSPs.

Figure 2:
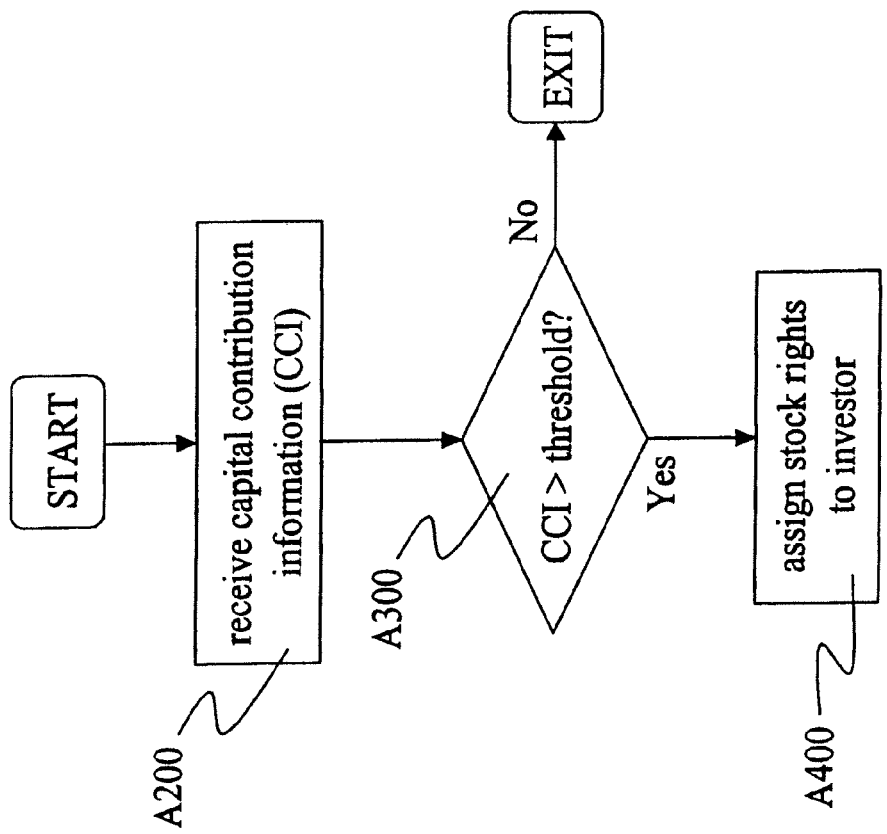
FIG. 2 is a flowchart representing the software logic employed in accordance with another aspect of the present invention.

It is further contemplated that a method of distributing stock rights as described herein may be practiced using one or more computers, each computer including one or more processors or other arrays of logic elements capable of receiving data and executing instructions on the data. FIG. 2 shows a flowchart for a method according to one embodiment of the invention. In act A200, capital contribution information (CCI) is received. The CCI relates to an amount of capital contributed to the fund by a particular investor. In one example, the CCI indicates a total amount in U.S. dollars that the investor has contributed or otherwise committed to the fund.

Figure 3:
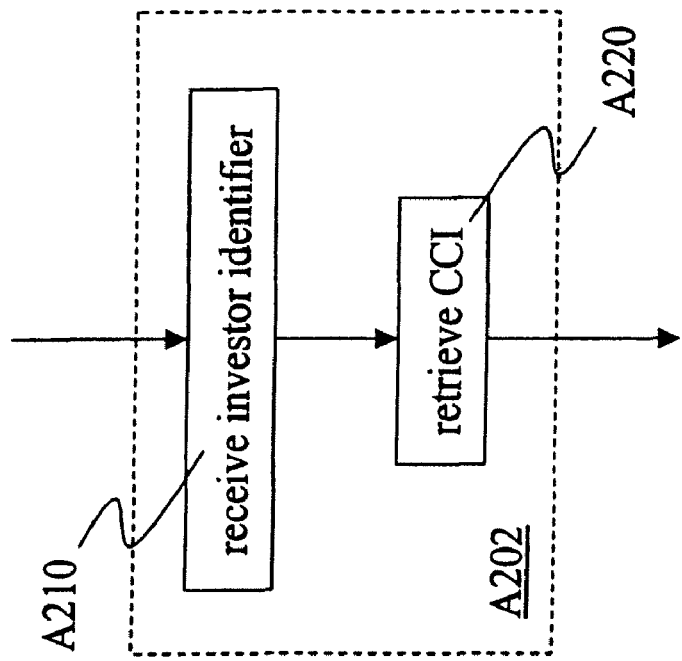
FIGS. 3-5 are further flowchart representations of the software employed in accordance with an aspect of the invention.

FIG. 3 shows an exemplary implementation A202 of act A200. In act A210, an investor identifier is received. For example, the investor identifier may be entered by an operator at a keyboard or may be received over a network or other communications link from a remote operator, another computer, or another portion of a computer. In such case, the investor identifier may be the name of the investor or another string of symbols that identifies the investor (e.g. an identification number). In another example, the investor identifier may be a string of symbols produced by another sequence of instructions (e.g. in response to an operator or other input as described above). In act A220, the CCI is retrieved from a storage element according to the investor identifier. For example, the investor identifier may indicate a memory location or a database entry where the CCI may be found. Alternatively, the CCI may be retrieved according to the investor identifier in conjunction with other information relating to the investor and/or to the fund. For example, a fund identifier (which may be received or produced in a manner similar to that described above for the investor identifier) may also be used in retrieving the CCI.

In act A300, the CCI is compared to a predetermined threshold amount. In one example, the comparison includes testing the proposition that the CCI exceeds the threshold amount, although in another example a different relation (i.e. the proposition that the CCI is less than the threshold amount) may be tested instead. If the comparison fails, the method may terminate with respect to this particular investor and fund, although the method may continue with respect to contributions by the investor to other funds and/or contributions by one or more other investors to the fund.

Figure 4:
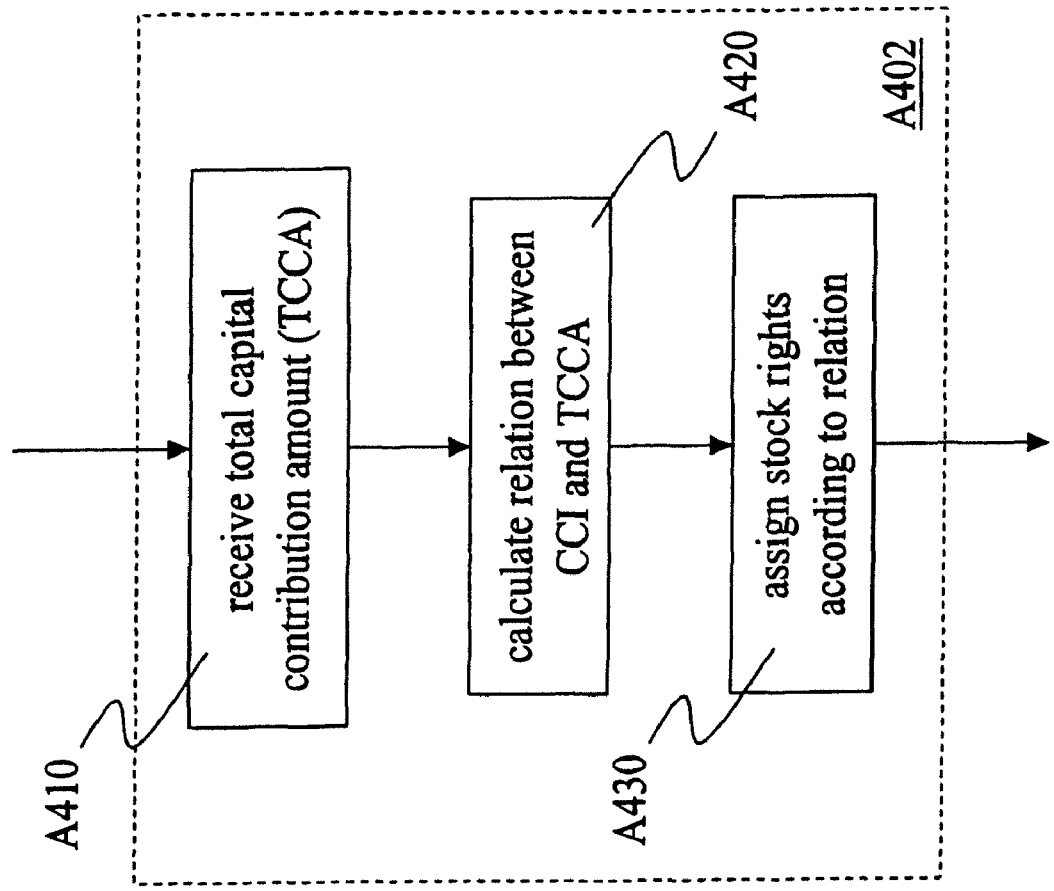

If the comparison of act A300 succeeds, then in act A400 stock rights are assigned to the investor. In one example, a predetermined amount of stock rights may be assigned to the investor. Alternatively, stock rights may be assigned according to an implementation A402 of task A400 as shown in FIG. 4. In act A410, a total capital contribution amount (TCCA) is received. The TCCA relates to a total amount of capital contributed to the fund by all of the investors (or possibly by a selected set of investors). In one example, the TCCA indicates a total amount in U.S. dollars that the investors have contributed or otherwise committed to the fund. In a manner analogous to the retrieval of the CCI in act A202 as shown in FIG. 3 and described above, the TCCA may be retrieved from a storage element according to a fund identifier (e.g. as mentioned above).

Figure 5:
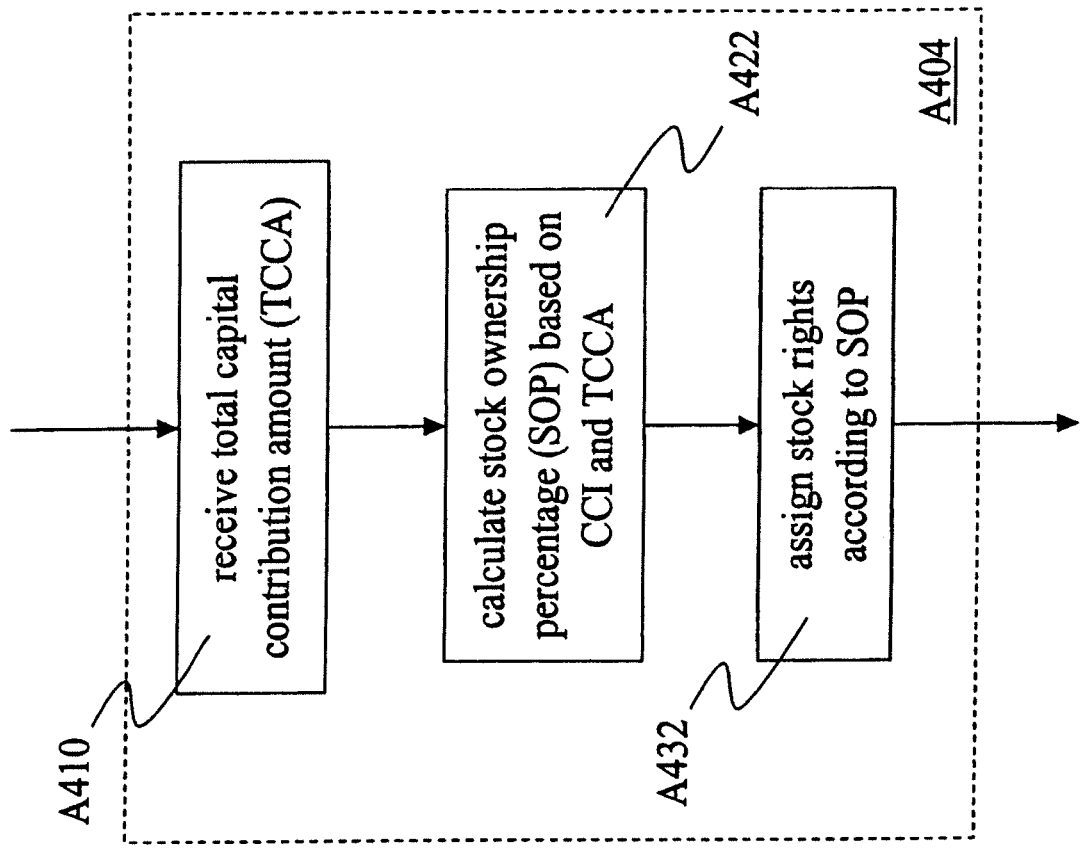

In act A420, a relation between the CCI and the TCCA is calculated, and in act A430 stock rights are assigned to the investor according to the relation. In FIG. 5, an implementation A404 of act A400 is described that includes implementations A422 and A432 of acts A420 and A430, respectively. In act A422, a stock ownership percentage (SOP) is calculated based on the CCI and the TCCA. For example, the SOP may be calculated as the percentage of the TCCA that the CCI represents. In act A432, stock rights are assigned to the investor according to the SOP. For example, a percentage of stock rights that is equal to the SOP may be assigned to the investor.

The foregoing specific embodiment has been provided to illustrate the principles of the present invention and is not intended to be limiting. To the contrary, the present invention is intended to encompass all modifications, substitutions, and alterations within the spirit and scope of the appended claims.

What is claimed is:

1. A computer implemented system for operating a venture capital investment business, the system comprising:
   a business entity computer associated with a business entity and configured to monitor an investment fund for venture capital and configured to receive capital contribution information of an investor; and
   a fund managing entity computer associated with a fund managing entity and coupled to the business entity computer and configured to administer matters and decisions relating to the investment fund, and configured to send and receive capital contribution information to the business entity computer,
   wherein the capital contribution information is used for an investment in a portfolio entity,
   an investor computer associated with the investor receives from the business entity computer general participation interest information in the investment fund for the investor, as determined by the business entity computer,
   the fund managing entity computer interfaces with the business entity computer for calculating carried interest information in the investment fund for the fund managing entity,
   the business entity computer is configured to determine stock rights in the business entity and provide stock rights information based on the determined stock rights to the investor via the investor computer so that the investor can exercise the stock rights to become a shareholder in the business entity,
   the business entity computer is configured to determine for the business entity a portion of IPO shares that become available in the portfolio entity, and
   the business entity computer is configured to determine shareholders of the business entity that are entitled to purchase IPO shares among the portion of IPO shares secured by the business entity that become available in the portfolio entity.

2. The system of claim 1, wherein in partial consideration for a fund investing in the portfolio entity, the portfolio entity agrees that a portion of IPO shares that become available as a result of an IPO therein are made available to shareholders of the business entity.

3. The system of 2, wherein the shareholders of the business entity are entitled to a percentage of the portion of IPO shares that is based on a pro-rata percentage of their stock ownership in the business entity, less any shares allocated otherwise and as calculated by the business entity computer.

4. The system of claim 1, wherein the business entity establishes a family of investment funds, each of the funds investing in associated portfolio entities, and investors that have provided at least a threshold capital contribution to at least one of the funds are provided with stock rights in the business entity to enable such investors to become shareholders in the business entity, and shareholders of the business entity can purchase IPO shares that become available in any of the portfolio entities of the family of funds.

5. The system of claim 1, wherein the business entity computer is configured to determine and identify shareholders as of an announced record date.

6. The system of claim 1, wherein the business entity computer is configured to calculate allocation of IPO shares that have been secured from the portfolio entity amongst shareholders assuming, on an issued and outstanding basis, all shareholders will participate in an offering of the IPO shares.

7. The system of claim 1, wherein the business entity computer is configured to maintain records and capture changes to a capital structure of portfolio entities in preparation for directed share subscription programs (DSSPs) and for preparing reports thereon.

8. A computer implemented method for operating a venture capital investment business, the method comprising:
   monitoring by a business entity computer associated with a business entity an investment fund for venture capital and receiving by the business entity computer capital contribution information of an investor;
   administering by a fund managing entity computer associated with a fund managing entity and coupled to the business entity computer matters and decisions relating to the investment fund, and sending and receiving by the fund managing entity computer capital contribution information to the business entity computer, wherein the capital contribution information is used for an investment in a portfolio entity;
   wherein an investor computer associated with the investor receives from the business entity computer general participation interest information in the investment fund for the investor, as determined by the business entity computer, and the fund managing entity computer interfacing with the business entity computer for calculating carried interest information in the investment fund for the fund managing entity;

determining by the business entity computer stock rights in the business entity and providing by the business entity computer stock rights information based on the determined stock rights to the investor via the investor computer so that the investor can exercise the stock rights to become a shareholder in the business entity;

determining by the business entity computer for the business entity a portion of IPO shares that become available in the portfolio entity;

and determining by the business entity computer shareholders of the business entity that are entitled to purchase IPO shares among the portion of IPO shares secured by the business entity that become available in the portfolio entity.

9. The method of claim 8, wherein in partial consideration for a fund investing in the portfolio entity, the portfolio entity agrees that a portion of IPO shares that become available as a result of an IPO therein are made available to shareholders of the business entity.

10. The method of claim 9, wherein the shareholders of the business entity are entitled to a percentage of the portion of IPO shares that is based on a pro-rata percentage of their stock ownership in the business entity, less any shares allocated otherwise and as calculated by the business entity computer.

11. The method of claim 8, wherein the business entity establishes a family of investment funds, each of the funds investing in associated portfolio entities, and investors that have provided at least a threshold capital contribution to at least one of the funds are provided with stock rights in the business entity to enable such investors to become shareholders in the business entity, and shareholders of the business entity can purchase IPO shares that become available in any of the portfolio entities of the family of funds.

12. The method of claim 8, further comprising determining and identifying by the business entity computer shareholders as of an announced record date.

13. The method of claim 8, further comprising calculating by the business entity computer allocation of IPO shares that have been secured from the portfolio entity amongst shareholders assuming, on an issued and outstanding basis, all shareholders will participate in an offering of the IPO shares.

14. The method of claim 8, further comprising maintaining by the business entity computer records and capture changes to a capital structure of portfolio entities in preparation for directed share subscription programs (DSSPs) and for preparing reports thereon.

15. A computer program product for distributing stock rights and including one or more computer executable instructions embedded on a computer readable medium and configured to cause one or more computer processors to perform the steps of:

monitoring by a business entity computer associated with a business entity an investment fund for venture capital and receiving by the business entity computer capital contribution information of an investor;

administering by a fund managing entity computer associated with a fund managing entity and coupled to the business entity computer matters and decisions relating to the investment fund, and sending and receiving by the fund managing entity computer capital contribution information to the business entity computer, wherein the capital contribution information is used for an investment in a portfolio entity;

wherein an investor computer associated with the investor receives from the business entity computer general participation interest information in the investment fund for the investor, as determined by the business entity computer, and the fund managing entity computer interfacing with the business entity computer for calculating carried interest information in the investment fund for the fund managing entity;

determining by the business entity computer stock rights in the business entity and providing by the business entity computer stock rights information based on the determined stock rights to the investor via the investor computer so that the investor can exercise the stock rights to become a shareholder in the business entity;

determining by the business entity computer for the business entity a portion of IPO shares that become available in the portfolio entity;

and determining by the business entity computer shareholders of the business entity that are entitled to purchase IPO shares among the portion of IPO shares secured by the business entity that become available in the portfolio entity.

16. The computer program product of claim 15, wherein in partial consideration for a fund investing in the portfolio entity, the portfolio entity agrees that a portion of IPO shares that become available as a result of an IPO therein are made available to shareholders of the business entity.

17. The computer program product of claim 16, wherein the shareholders of the business entity are entitled to a percentage of the portion of IPO shares that is based on a pro-rata percentage of their stock ownership in the business entity, less any shares allocated otherwise and as calculated by the business entity computer.

18. The computer program product of claim 15, wherein the business entity establishes a family of investment funds, each of the funds investing in associated portfolio entities, and investors that have provided at least a threshold capital contribution to at least one of the funds are provided with stock rights in the business entity to enable such investors to become shareholders in the business entity, and shareholders of the business entity can purchase IPO shares that become available in any of the portfolio entities of the family of funds.

19. The computer program product of claim 15, further comprising calculating by the business entity computer allocation of IPO shares that have been secured from the portfolio entity amongst shareholders assuming, on an issued and outstanding basis, all shareholders will participate in an offering of the IPO shares.

20. The computer program product of claim 15, further comprising maintaining by the business entity computer records and capture changes to a capital structure of portfolio entities in preparation for directed share subscription programs (DSSPs) and for preparing reports thereon.

* * * * *